United States Patent
Clifford

(10) Patent No.: US 8,726,925 B2
(45) Date of Patent: May 20, 2014

(54) BACK PRESSURE REGULATING VALVE WITH VALVE CARTRIDGE

(75) Inventor: Jason D. Clifford, Brooklyn Park, MN (US)

(73) Assignee: Tescom Corporation, Elk River, MN (US)

( * ) Notice: Subject to any disclaimer, the term of this patent is extended or adjusted under 35 U.S.C. 154(b) by 377 days.

(21) Appl. No.: 13/052,535

(22) Filed: Mar. 21, 2011

(65) Prior Publication Data
US 2012/0241658 A1    Sep. 27, 2012

(51) Int. Cl.
*F16K 17/00*    (2006.01)

(52) U.S. Cl.
USPC .............. 137/315.04; 137/315.11; 137/454.4; 137/454.6; 137/505.41; 137/505.42

(58) Field of Classification Search
USPC ......... 251/331, 333; 137/15.08, 15.18–15.19, 137/315.04, 315.11, 116.3, 116.5, 137/454.4–454.6, 505, 505.13, 505.15, 137/505.36, 505.41–505.42, 505.46–505.47
See application file for complete search history.

(56) References Cited

U.S. PATENT DOCUMENTS

| | | | |
|---|---|---|---|
| 2,585,575 A | | 2/1952 | Nedergaard |
| 4,055,198 A | | 10/1977 | Iannelli |
| 4,471,802 A | * | 9/1984 | Pryor ........................ 137/454.2 |
| 4,693,267 A | | 9/1987 | Patterson |
| 4,719,940 A | * | 1/1988 | Beavers .................... 137/505.39 |
| 5,056,550 A | * | 10/1991 | Mooney ....................... 137/270 |
| 2011/0000553 A1 | | 1/2011 | Clifford |

OTHER PUBLICATIONS

International Search Report for PCT/US2012/026102, mailed Jun. 13, 2012.
Written Opinion for PCT/US2012/026102, mailed Jun. 13, 2012.

* cited by examiner

*Primary Examiner* — John K Fristoe, Jr.
*Assistant Examiner* — Marina Tietjen
(74) *Attorney, Agent, or Firm* — Marshall, Gerstein & Borun LLP; Michael P. Furmanek

(57) ABSTRACT

A back pressure regulating valve includes a valve body having a fluid inlet, a fluid outlet, a central bore, a bonnet housing a load spring operatively coupled to a diaphragm, and a chamber in flow communication with the fluid inlet. A valve cartridge includes a housing sized to fit within the central bore and including a first portion, a second portion, a valve guide, and a flow passage. A valve seat is disposed in the housing, and a valve plug is shiftable between an open position permitting flow and a closed position preventing flow. The valve plug engages a valve guide, and a spring biases the valve plug toward the open position. A retainer is disposed adjacent the first portion of the housing and engages a portion of the valve plug to retain the valve plug in the housing.

20 Claims, 5 Drawing Sheets

BACK PRESSURE REGULATING VALVE WITH VALVE CARTRIDGE

FIELD OF TECHNICAL ART

The present invention relates to back pressure regulating valves and, more specifically, to a back pressure regulating valve employing an integrated valve cartridge that may be mounted within the valve housing.

BACKGROUND

Pressure regulating valves are used in a wide variety of industrial and residential applications for controlling the downstream pressure of a fluid. For example, in chemical processing plants or oil refineries, pressure regulating valves are used to manipulate a fluid flowing within the system to compensate for increases or decreases in demand or other load disturbances, and thus control the pressure of the fluid within a desired range. Generally speaking, when the downstream demand increases, a pressure regulating valve opens to allow more fluid to flow through the valve to the downstream portion of the system, thus maintaining a relatively constant downstream pressure. On the other hand, when the downstream demand decreases, the pressure regulating valve closes to reduce the amount of fluid flowing through the valve, again maintaining a relatively constant downstream pressure.

On the other hand, a back-pressure regulating valve operates on different principles. Whereas the above-mentioned pressure regulators regulate the fluid pressure on the downstream side of the valve, a back-pressure regulator controls the pressure on the upstream side of the valve. Consequently, a back-pressure regulator opens when the pressure on the inlet or upstream side exceeds a set point.

SUMMARY

In accordance with one exemplary aspect, a back pressure regulating valve includes a valve body having a fluid inlet, a fluid outlet, and a central bore disposed between the fluid inlet and the fluid outlet, a bonnet coupled to the valve body and housing a load spring operatively coupled to a diaphragm, with the diaphragm cooperating with a portion of the valve body to form a chamber, and with the chamber in flow communication with the fluid inlet via a port, and a valve cartridge disposed in the central bore of the valve body. The valve cartridge includes a housing sized to fit within the central bore and including a first portion, a second portion, a valve guide, and a flow passage positioned to provide flow communication between the chamber and the fluid outlet. The valve cartridge also includes a valve seat disposed in the housing along the flow passage and between the first portion and the second portion, a valve plug disposed in the housing and shiftable between an open position permitting flow though the flow passage and a closed position preventing flow though the flow passage, with the valve plug including a portion engaging the valve guide, a spring operatively coupled to the valve plug and arranged to bias the valve plug toward the open position, and a retainer disposed adjacent the first portion of the housing and engaging a portion of the valve plug to retain the valve plug in the housing.

In accordance with one or more preferred forms, the back pressure regulator may include one or more of the following exemplary features, either alone or in any combination, outlined in the succeeding paragraphs. Specifically, the retainer may include a cap having a flange arranged to abut a stop coupled to the housing, and the valve seat may formed by a removable seat ring mounted in the flow passage, and including a seat ring retainer removably coupled to the housing and positioned to secure the seat ring, wherein the stop is carried by an upper portion of the seat ring retainer.

The seat ring retainer may include a bore sized to slidably receive the cap, and the cap may include a bore, and the valve plug may include an upper stem portion extending into the bore in the cap, with a spring coupled to the cap and the valve plug and arranged to bias the valve plug toward the valve seat. The seat ring retainer includes an upper aperture and wherein the cap includes an upper portion sized to extend into the aperture, and wherein the cap is responsive to movement of the diaphragm. The housing may include a lower bore adjacent the second end, with the lower bore receiving the spring and forming the valve guide, and the valve plug may include a lower stem portion extending into the lower bore.

The central bore of the valve body and an exterior portion of the housing may be joined by cooperating threads, and the valve cartridge may form a single integrated unit removable from the central bore of the valve body, preferably in one piece. An adjuster may carried by the bonnet and may be arranged to apply an adjustable pre-load to the load spring, such that the back pressure regulator operates at or near a desired set point.

In accordance with another aspect, a back pressure regulating valve may include a valve body having a fluid inlet, a fluid outlet, and a central bore disposed between the fluid inlet and the fluid outlet, a diaphragm assembly, with a portion of the diaphragm cooperating with a portion of the valve body to form a chamber, and with the chamber in flow communication with the fluid inlet via a port, and a valve cartridge disposed in the central bore of the valve body. The valve cartridge includes a housing removably mounted within the central bore and including a flow passage arranged to allow flow communication between the chamber and the fluid outlet, a valve seat disposed in the housing along the flow passage, a valve plug disposed in the housing and shiftable between an open position permitting flow though the flow passage and a closed position seated against the valve seat and preventing flow though the flow passage, a first spring operatively coupled to the valve plug and arranged to bias the valve plug toward the open position, and a cap operatively coupled to the valve plug and having a flange positioned to engage a stop coupled to the housing to retain the valve plug in the housing.

In accordance with one or more additional preferred forms, the seat retainer ring is positioned to secure the valve seat to the housing, with a portion of the seat retainer ring forming the stop. The valve plug may include an upper stem portion, and the cap may be slidably disposed in the seat retainer ring, with the cap including a bore sized to receive the upper stem portion, and including a second spring operatively coupling the cap and the valve plug and arranged to bias the valve plug toward the valve seat. The seat ring retainer includes an upper aperture and the cap may include an upper portion sized to extend into the aperture, and the cap may be arranged to move against the force of the second spring in response to movement of the diaphragm.

The housing may include a lower bore and the valve plug may include a lower stem portion extending into the bore, with the lower stem portion and the lower bore cooperating to form a valve guide, and with the first spring disposed in the lower bore. The central bore of the valve body and an exterior portion of the housing preferably are joined by cooperating threads, and the valve cartridge forms a single integrated unit removable from the central bore of the valve body. A load spring may be disposed inside the valve bonnet, positioned to apply a force against the diaphragm, and an adjuster may be arranged to apply an adjustable preload to the load spring.

In accordance with another preferred aspect, a method of assembling a back pressure regulating valve comprises the steps of selecting a valve body having a fluid inlet, a fluid outlet, and a central bore disposed between the fluid inlet and the fluid outlet, providing a diaphragm assembly arranged so that a portion of the diaphragm cooperates with a portion of the valve body to form a chamber, and providing flow communication between the chamber and the fluid inlet, and assembling a valve cartridge having a housing sized for insertion into the central bore of the valve body. The housing is provided with a flow passage arranged to allow flow communication between the chamber and the fluid outlet, and is provided with a valve seat along the flow passage. A valve plug is positioned in the housing and the valve plug is arranged to be shiftable between an open position permitting flow though the flow passage and a closed position seated against the valve seat and preventing flow though the flow passage. A first spring is provided operatively coupled to the valve plug and arranged to bias the valve plug toward the open position, and a cap is coupled to the valve plug, with the cap having a flange positioned to engage a corresponding stop coupled to the housing to retain the valve plug in the housing.

In accordance with additional preferred forms, a seat retainer ring may be provided positioned to secure the valve seat to the housing, and the stop may be provided on a portion of the seat retainer ring. The method may include providing an upper stem portion on the valve plug, and positioning the upper stem portion in a bore in the cap to permit sliding movement between the upper stem portion and the cap, and providing a second spring operatively coupling the cap to the valve plug and arranged to bias the valve plug toward the valve seat. Further, the method may include providing the cap with an upper portion sized to extend into the aperture, and arranging the cap to move against the force of the second spring in response to movement of the diaphragm. The method may further include providing the valve plug with a lower stem portion and providing the housing with a lower bore sized to receive the lower stem portion to form a valve guide, and positioning the first spring in the lower bore.

DETAILED DESCRIPTION

Figure 1:
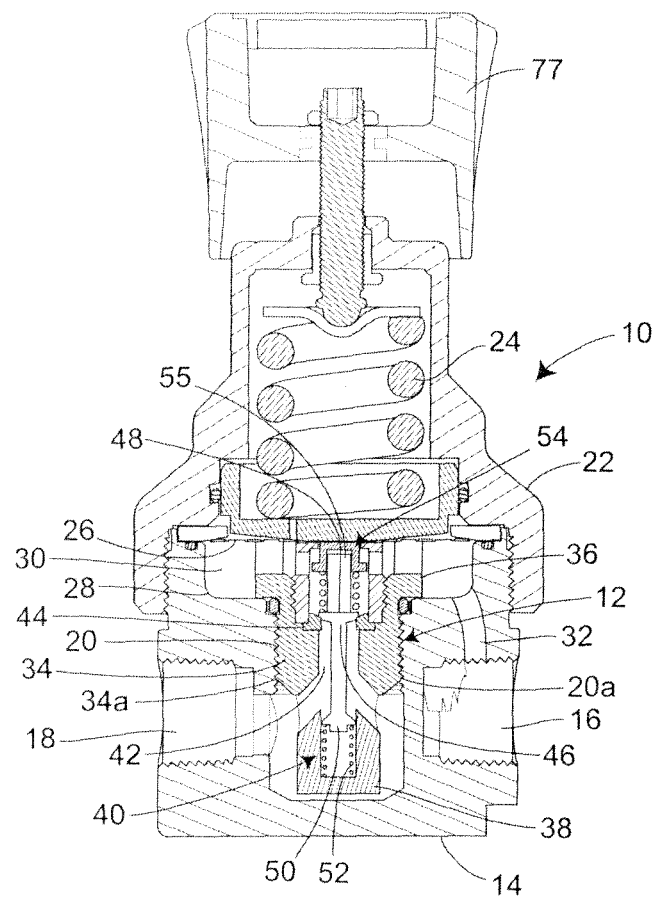
FIG. 1 is a cross-sectional view of a back pressure regulating valve incorporating a back pressure regulating cartridge assembled in accordance with the teachings of a first disclosed example of the present invention.

Referring now to the drawings, FIG. 1 illustrates a back pressure regulating valve 10 (hereinafter "the valve 10") assembled in accordance with the teachings of a first disclosed example of the present invention and employing a valve cartridge 12. The valve 10 includes a valve body 14 having a fluid inlet 16, a fluid outlet 18, and a central bore 20 disposed between the fluid inlet 16 and the fluid outlet 18. The valve 10 includes a bonnet 22 coupled to the valve body 14 and housing a load spring 24 operatively coupled to a diaphragm 26. A diaphragm plate may also be provided as would be known to those of skill in the art. The diaphragm 26 cooperates with a recessed portion 28 of the valve body 14 to form a chamber 30. The chamber 30 is in flow communication with the fluid inlet 16 via a port 32, such that the chamber 30 is exposed to fluid pressure on the upstream or fluid inlet side of the valve 10.

Figure 2:
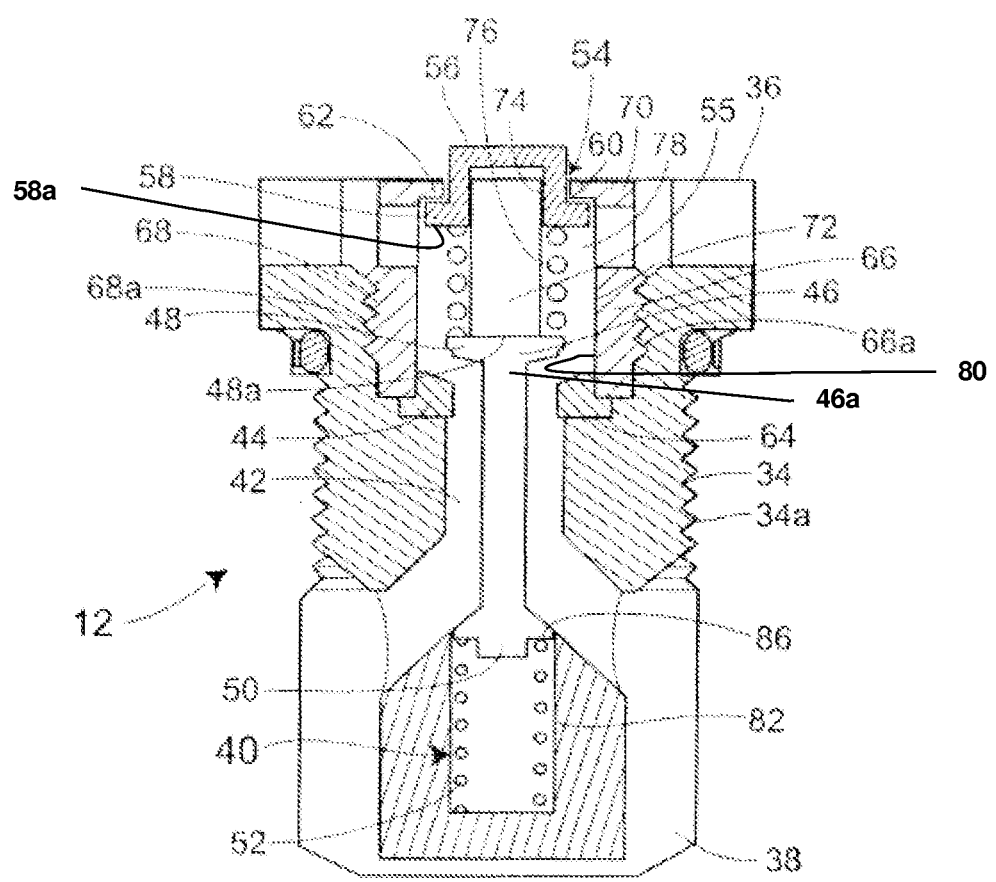
FIG. 2 is an enlarged view, partly in cross-section, of the back pressure regulator cartridge for use in the example of FIG. 1 and illustrating the valve in an open position.
Figure 3:
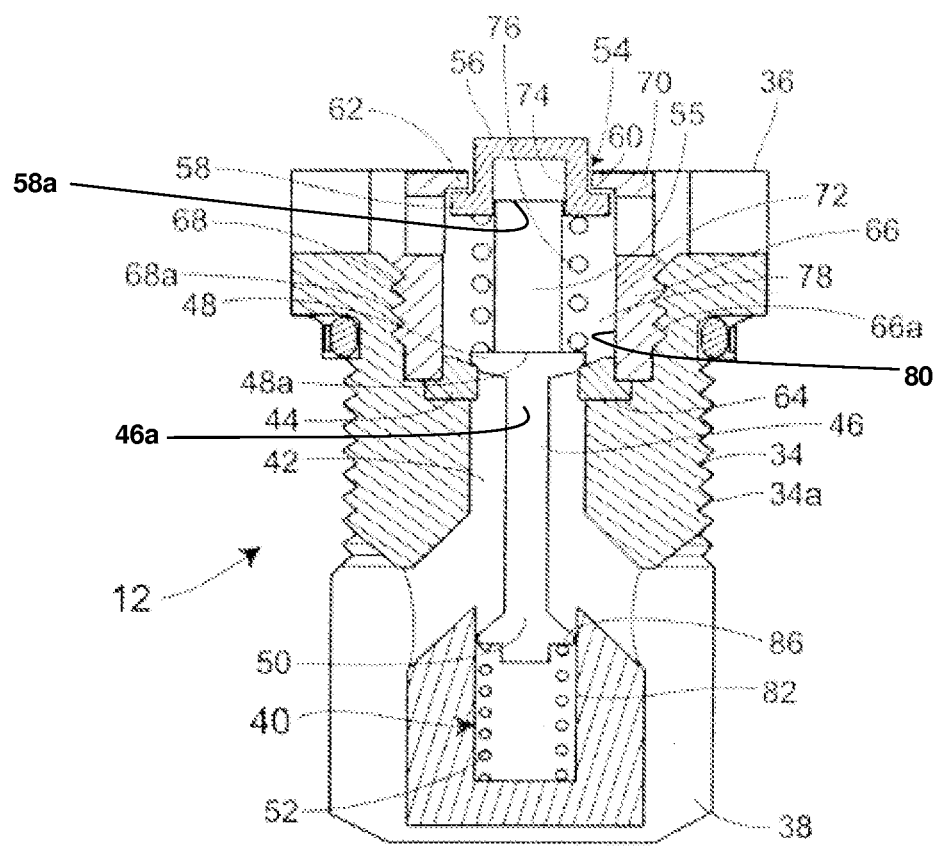
FIG. 3 is another enlarged view, partly in cross-section, of the back pressure regulator cartridge of FIG. 2 and illustrating the valve in a closed position.

Referring still to FIG. 1, the valve cartridge 12 is disposed in the central bore 20 of the valve body 14. The valve cartridge 12 includes a housing 34 which is sized to fit within the central bore 20 of the valve body 14. In the example shown, the housing 34 includes external threads 34a, while the central bore 20 of the valve body 14 includes internal threads 20a. Other means of joining the housing 34 to the valve body 14 may prove suitable. The housing 34 includes an upper or first portion 36 and a lower or second portion 38. The housing 34 may also include a valve guide 40. The housing 34 includes a flow passage 42, which is positioned so as to provide flow communication between the chamber 30 and the fluid outlet 18, thus effectively providing flow communication between the fluid inlet 16 and the fluid outlet 18. A valve seat 44 is disposed in the housing 34 along the flow passage 42, and generally between the first portion 36 and the second portion 38. A valve plug 46 is disposed in the housing 34 and includes a control element 48 sized to engage the valve seat 44. The valve plug 46 is shiftable between an open position (as shown in FIG. 2), in which the control element 48 is spaced away from the valve seat 44, and a closed position (as shown in FIG. 3), in which the control element 48 is seated against the valve seat 44. Thus, when the valve plug 46 is in the open position of FIG. 2, the valve 10 permits flow from the fluid inlet 16, through the port 32 to the chamber 30, through the flow passage 42 past the valve seat 44, and to the fluid outlet 18. Similarly, when the valve plug 46 is in the closed position of FIG. 3, flow is blocked by the control element 48 seated against the valve seat 44, thus blocking the flow passage 42.

In the example shown, a lower portion 50 of the valve plug 46 engages the valve guide 40, and a spring 52 is operatively coupled to the valve plug 46, with the spring 52 arranged to bias the valve plug 46 toward the open position of FIG. 2. The valve cartridge 12 further includes a retainer 54, which is disposed adjacent the first portion 36 of the housing 34. The retainer 54 engages an upper portion 55 of the valve plug 46 to retain the valve plug 46 in the housing 34.

Referring now to FIGS. 2 and 3, in the example shown the retainer 54 takes the form of a cap 56 having an annular flange 58, and the annular flange 58 is positioned to abut a corresponding stop 60 formed by an inwardly extending flange 62. The stop 60 is carried by the housing 34. The valve seat 44 is disposed at a mounting area 64 formed in the housing 34 and, in the example shown, the valve seat 44 is held in place by a seat ring retainer 66. The seat ring retainer 66 includes external threads 66a and is threaded into a bore 68 having internal threads 68a formed in the upper portion 36 of the housing 34. The stop 60 and flange 62 are, in the example shown, part of the seat ring retainer 66. More specifically, the stop 60 flange 62 are formed by an upper portion 70 of the seat ring retainer 66.

The upper portion 55 of the valve plug extends upwardly from the control element 48, and the lower portion 50 extends downwardly from the control element 48. The seat ring retainer 66 has an internal bore 72, and the annular flange 58 of the cap 56 is sized to be slidably received in the internal bore 72. The cap 56 includes a bore 74, and the bore 74 is sized to receive the upper portion 55 of the valve plug 46. A spring 76 is disposed in a space 78 between the control element 48 and the cap 56. In the example shown, the spring 76 bears against an upper surface 48a of the control element 48 and a lower surface 58a of the flange 58 of the cap 56. Consequently, a spring 76 applies a biasing force against the valve plug 46 to urge the valve plug and hence the control element 48 toward the closed position of FIG. 3.

The seat ring retainer 66 includes an aperture 80 which is sized to allow at least a portion of the cap 56 to extend through the aperture 80 (see FIG. 2), and the upper portion 46a of the valve plug 46 is slidable within the bore 74 of the cap 56. Consequently, when the diaphragm 26 presses against the cap 56, the force of the control element 48 against the valve seat 44 is controlled by the force of the spring 76, which prevents the diaphragm/load spring assembly from causing damage to the control element 48 and/or the valve seat 44 from too much force. The force of the load spring 24 against the diaphragm 26 may be controlled by an adjuster 77 (FIG. 1), which enables the valve 10 to open at a desired set point as would be known to those of skill in the art.

Referring still to FIGS. 2 and 3, the lower portion 50 of the valve plug 46 extends into a lower bore 82 formed in the housing 34 generally adjacent the lower portion 38 of the housing 34. In the example shown, the bore 82 is a blind bore. The spring 52 is disposed in the bore 82 and engages a bottom portion of the bore 82 as well as an abutment 86 carried by the lower portion 50 of the valve plug 46. Consequently, the spring 52 applies the biasing force to the valve plug 46 in a direction that would cause the valve plug 46 to move away from the valve seat 44 and toward the open position of FIG. 2.

Additionally, the lower bore 82 helps to form at least a portion of the valve guide 40. Further, the cap 56 disposed in the bore 72 of the seat ring retainer 66, in conjunction with the upper portion 55 of the valve plug 46 disposed in the bore 74, which also helps to perform a valve guiding function, either alone or in combination with the lower bore 82. Those of skill in the art will understand that the cap 56 and the seat ring retainer 66 are constructed to allow flow from the chamber 30 through the space 78 to the valve seat/control element assembly.

In operation, a user typically adjusts the load on the load spring 24 using the adjuster 77 such that the valve 10 will open and close at the desired set point. Because the chamber 30 is exposed to pressure from the upstream or fluid inlet side of the valve 10 via the port 32, the valve will remain in the closed position until the upward force on the diaphragm 26 caused by the pressure in the chamber 30 overcomes the downward force of the load spring 24 against the diaphragm 26. When the pressure in the chamber 30 exceeds the set point, the diaphragm 26 moves upwardly, which allows the spring 52 to push the valve plug 46 upwardly, thus moving the control element 48 off the valve seat 44 to the open position of FIG. 2.

The valve 10 will remain open until the upstream pressure drops below the desired set point, at which point the downward force of the load spring/diaphragm assembly is greater than the upward force caused by the fluid pressure in the chamber 30, and the valve plug/control element return to the closed position of FIG. 3.

Figure 4:
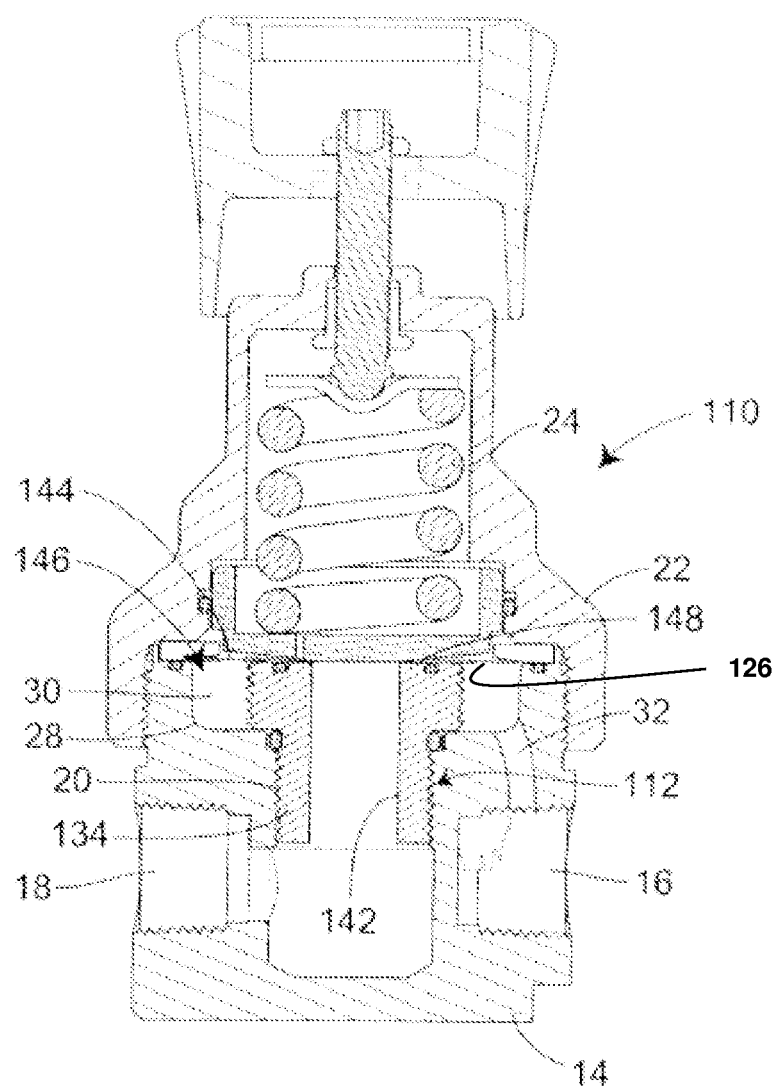
FIG. 4 is a cross-sectional view of a back pressure regulating valve assembled in accordance with the teachings of a second disclosed example of the present invention.

Referring now to FIG. 4, a control valve 110 employing a simplified version of a valve cartridge 112 is shown. The valve 110 preferably includes the same valve body 14 discussed above, including the fluid inlet 16, the fluid outlet 18, and the central bore 20. Additionally, the control valve 110 includes the same bonnet 22, load spring 24, diaphragm 26, recessed portion 28, chamber 30, and port 32. In the example of FIG. 4, a housing 134 includes a central flow passage 142. A lower surface of a diaphragm 126 seats directly against a valve seat 144, such that the diaphragm 126 effectively forms a control element 148. The valve seat 144 preferably is formed of a suitable material to provide a sufficient seal between the diaphragm 126 and the valve seat 144. The seat may include an o-ring 146.

In operation, the valve 110 operates according to the same basic principles as the valve 10. Specifically, the chamber 30 is exposed to pressure from the upstream or fluid inlet side of the valve 10 via the port 32, and the valve will remain in the closed position of FIG. 4 until the upward force on the diaphragm 126 caused by the pressure in the chamber 30 overcomes the downward force of the load spring 24 against the diaphragm 126. When the pressure in the chamber 30 exceeds the set point, the diaphragm 126 moves upwardly, such that the diaphragm 126/control element 148 move away from the valve seat 144 to an open position, allowing flow communication between the chamber 30 and the central flow passage 142, thus allowing flow communication between the fluid inlet 16 and a fluid outlet 18.

As with the valve 10 described above, the valve 110 will remain open until the upstream pressure drops below the desired set point, at which point the downward force of the load spring/diaphragm assembly is greater than the upward force caused by the fluid pressure in the chamber 30, and the valve plug/control element return to the closed position.

Figure 5:
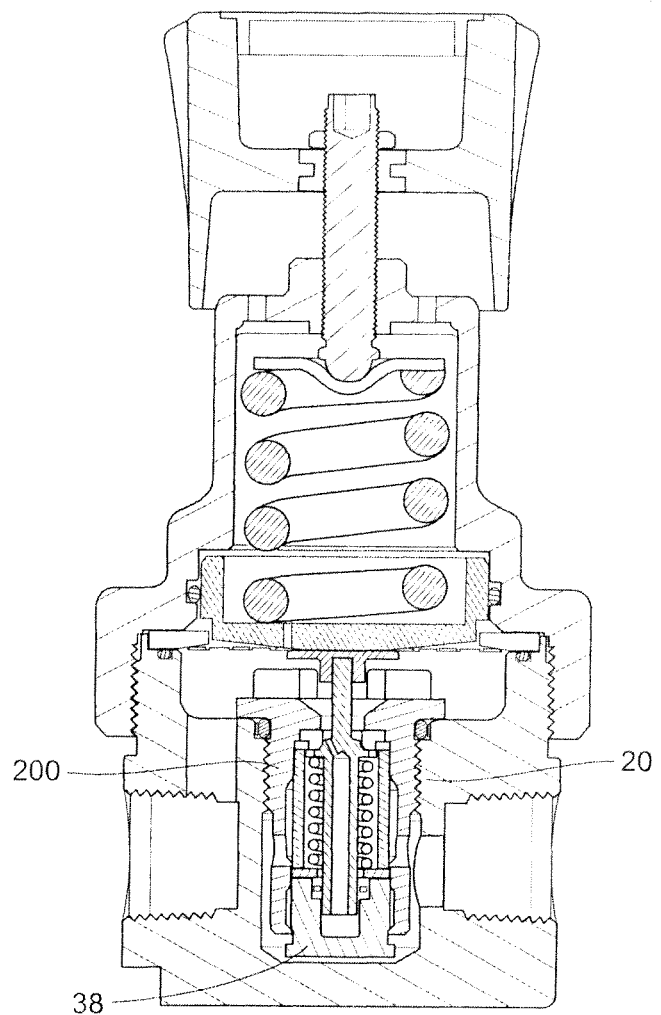
FIG. 5 is a cross-sectional view of a pressure reducing regulating valve incorporating a pressure reducing regulating cartridge and using the same valve body found in the back pressure regulating valve of FIG. 1.

In accordance with the disclosed example, the valve cartridge 12 may be removed from the valve body 14 as a single integrated unit including, for example, the housing 34, the valve plug 46, the retainer 54, and the other components associated with the cartridge. This integrated or modular design for the valve cartridge 12 may offer a number of potential advantages. For example, by using a standardized valve body 14, it is possible to remove the back pressure regulating valve cartridge 14 as a single unit, and insert a pressure reducing valve cartridge 200 of the type shown on the pressure reducing regulator of FIG. 5. Of course, the opposite is true as well, thus allowing one to readily convert the pressure reducing regulator of FIG. 5 back to the back pressure regulating valve of FIG. 1. As shown in either FIG. 1, FIG. 4, or FIG. 5, a lower portion of the central bore 20 is sized to receive the lower portion 38 of the housing 34 of the cartridge 12 of FIG. 1, the cartridge of FIG. 4, or the cartridge of FIG. 5. Additional details regarding the valve cartridge 100 of the pressure reducing regulator of FIG. 5 can be found in U.S. patent application Ser. No. 12/496,868, which is co-pending herewith and commonly assigned, the entire disclosure of which is incorporated herein by reference.

In further accordance with one or more aspects of the disclosed example or examples, a back pressure cartridge that is designed to fit within a standardized cartridge port in a valve body permits a pressure reducing regulator to be easily converted to a back pressure regulator, and vice versa, simply by swapping a pressure reducing cartridge for a back pressure cartridge. Thus, a single standardized valve body may be used for either type of regulator. The ability to build two different types of regulators from the same valve body simplifies manufacturing and makes field repairs easier. The examples disclosed herein may also use a filtered back pressure cartridge which may offer protection for the valve seat, and may be used on balanced designs for use with higher pressure applications. The present disclosure can easily be scaled up or down for numerous flow requirements.

Preferred embodiments of the disclosed invention are described herein, including the best mode or modes known to the inventors for carrying out the invention. Although numerous examples are shown and described, those of skill in the art will readily understand that details of the various embodiments need not be mutually exclusive. Instead, those of skill in the art, upon reading the teachings herein, should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A back pressure regulating valve, comprising:
   a valve body having a fluid inlet, a fluid outlet, and a central bore disposed between the fluid inlet and the fluid outlet;
   a bonnet coupled to the valve body and housing a load spring operatively coupled to a diaphragm, the diaphragm cooperating with a portion of the valve body to form a chamber, the chamber in flow communication with the fluid inlet via a port; and
   a valve cartridge disposed in the central bore of the valve body, the valve cartridge including:
      a housing sized to fit within the central bore, the housing including a first portion, a second portion, a valve guide, and a flow passage positioned to provide flow communication between the chamber and the fluid outlet;
      a valve seat disposed in the housing along the flow passage and between the first portion and the second portion;
      a valve seat retainer removably disposed in the first portion of the housing and positioned to secure the valve seat;
      a valve plug disposed in the housing and shiftable between an open position permitting flow though the flow passage and a closed position preventing flow though the flow passage, the valve plug including a portion engaging the valve guide;
      a spring at least partially disposed within the second portion of the housing and operatively coupled to the valve plug and arranged to bias the valve plug toward the open position; and
      a retainer disposed adjacent the first portion of the housing and engaging a portion of the valve plug to retain the valve plug in the housing.

2. The back pressure regulating valve of claim 1, wherein the retainer includes a cap having a flange arranged to abut a stop coupled to the housing.

3. The back pressure regulating valve according to any of the preceding claims, wherein the valve seat is formed by a removable seat ring mounted in the flow passage, and wherein the valve seat retainer comprises a seat ring retainer removably coupled to the housing and positioned to secure the seat ring, and wherein the stop is carried by an upper portion of the seat ring retainer.

4. The back pressure regulating valve according to claim 3, wherein the seat ring retainer includes a bore sized to slidably receive the retainer, the retainer including a bore, and wherein the valve plug includes an upper stem portion extending into the bore in the retainer and including a further spring coupled to the retainer and the valve plug and arranged to bias the valve plug toward the valve seat.

5. The back pressure regulating valve according to claim 3, wherein the seat ring retainer includes an upper aperture and wherein the retainer includes an upper portion sized to extend into the aperture, and wherein the retainer is responsive to movement of the diaphragm.

6. The back pressure regulating valve according to claim 1, wherein the housing includes a lower bore defined by the second portion, the lower bore receiving the spring and forming the valve guide, and wherein the valve plug includes a lower stem portion extending into the lower bore.

7. The back pressure regulating valve according to claim 1, wherein the central bore of the valve body and an exterior portion of the housing are joined by cooperating threads, and wherein the valve cartridge forms a single integrated unit removable from the central bore of the valve body.

8. The back pressure regulating valve according to claim 1, including an adjuster carried by the bonnet and arranged to apply an adjustable pre-load to the load spring.

9. A back pressure regulating valve, comprising:
   a valve body having a fluid inlet, a fluid outlet, and a central bore disposed between the fluid inlet and the fluid outlet;
   a diaphragm assembly, a portion of the diaphragm assembly cooperating with a portion of the valve body to form a chamber, the chamber in flow communication with the fluid inlet via a port; and
   a valve cartridge disposed in the central bore of the valve body, the valve cartridge including:
      a housing removably mounted within the central bore, the housing including a flow passage arranged to allow flow communication between the chamber and the fluid outlet;
      a valve seat disposed in the housing along the flow passage;
      a valve plug disposed in the housing and shiftable between an open position permitting flow though the flow passage and a closed position seated against the valve seat and preventing flow though the flow passage;
      a first spring operatively coupled to the valve plug and arranged to bias the valve plug toward the open position;
      a cap operatively coupled to the valve plug and having a flange positioned to engage a stop coupled to the housing to retain the valve plug in the housing; and
      a second spring operatively coupling the cap and the valve plug and arranged to bias the valve plug toward the valve seat.

10. The back pressure regulating valve of claim 9, including a seat ring retainer positioned to secure the valve seat to the housing, a portion of the seat ring retainer forming the stop.

11. The back pressure regulating valve of claim 9, wherein the valve plug includes an upper stem portion, and wherein the cap is slidably disposed in a seat ring retainer, the cap including a bore sized to receive the upper stem portion.

12. The back pressure regulating valve of claim 11, wherein the seat ring retainer includes an upper aperture and wherein the cap includes an upper portion sized to extend into the aperture, and wherein the cap is arranged to move against the force of the second spring in response to movement of the diaphragm.

13. The back pressure regulating valve of claim 9, wherein the housing includes a lower bore and the valve plug includes a lower stem portion extending into the bore, the lower stem portion and the lower bore cooperating to form a valve guide, and wherein the first spring is disposed in the lower bore.

14. The back pressure regulating valve of claim 9, wherein the central bore of the valve body and an exterior portion of the housing are joined by cooperating threads, and wherein the valve cartridge forms a single integrated unit removable from the central bore of the valve body.

15. The back pressure regulating valve of claim 9, including a load spring disposed inside the valve bonnet and positioned to apply a force against the diaphragm, and including an adjuster arranged to apply an adjustable preload to the load spring.

16. A method of assembling a back pressure regulating valve comprising the steps of:
   selecting a valve body having a fluid inlet, a fluid outlet, and a central bore disposed between the fluid inlet and the fluid outlet;
   providing a diaphragm assembly arranged so that a portion of the diaphragm assembly cooperates with a portion of the valve body to form a chamber, and providing flow communication between the chamber and the fluid inlet; and
   assembling a valve cartridge as a single integrated unit having a housing sized for insertion into the central bore of the valve body;
   providing the housing with a flow passage arranged to allow flow communication between the chamber and the fluid outlet;
   providing the housing with a valve seat along the flow passage;
   positioning a valve plug in the housing and arranging the valve plug to be shiftable between an open position permitting flow though the flow passage and a closed position seated against the valve seat and preventing flow though the flow passage;
   providing a first spring operatively coupled to the valve plug and arranged to bias the valve plug toward the open position;
   coupling a cap to the valve plug, the cap having a flange positioned to engage a corresponding stop coupled to the housing to retain the valve plug in the housing; and
   providing a second spring operatively coupling the cap to the valve plug and arranged to bias the valve plug toward the valve seat.

17. The method of claim 16, and further comprising providing a seat ring retainer positioned to secure the valve seat to the housing, and providing the stop on a portion of the seat ring retainer.

18. The method of claim 16, including providing an upper stem portion on the valve plug, and positioning the upper stem portion in a bore in the cap to permit sliding movement between the upper stem portion and the cap.

19. The method of claim 18, including providing a seat ring retainer with an upper aperture and providing the cap with an upper portion sized to extend into the aperture, and arranging the cap to move against the force of the second spring in response to movement of the diaphragm.

20. The method of claim 16, including providing the valve plug with a lower stem portion and providing the housing with a lower bore sized to receive the lower stem portion to form a valve guide, and positioning the first spring in the lower bore.

* * * * *